Oct. 17, 1944.  W. F. THOMA  2,360,805
SEAT SLIDE STRUCTURE
Filed Nov. 29, 1941  2 Sheets-Sheet 1
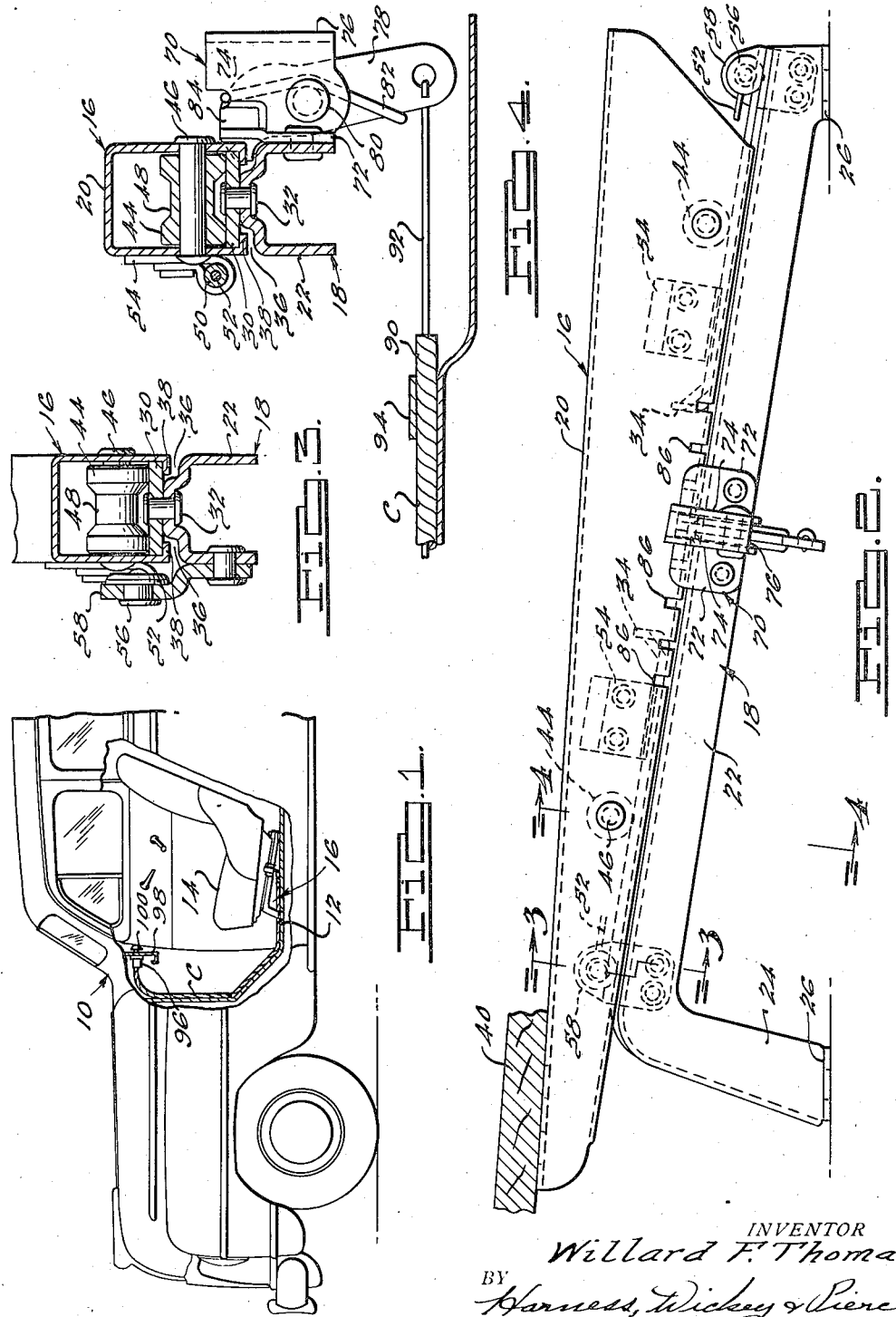
INVENTOR
Willard F. Thoma.
BY Harness, Dickey & Pierce.
ATTORNEYS.

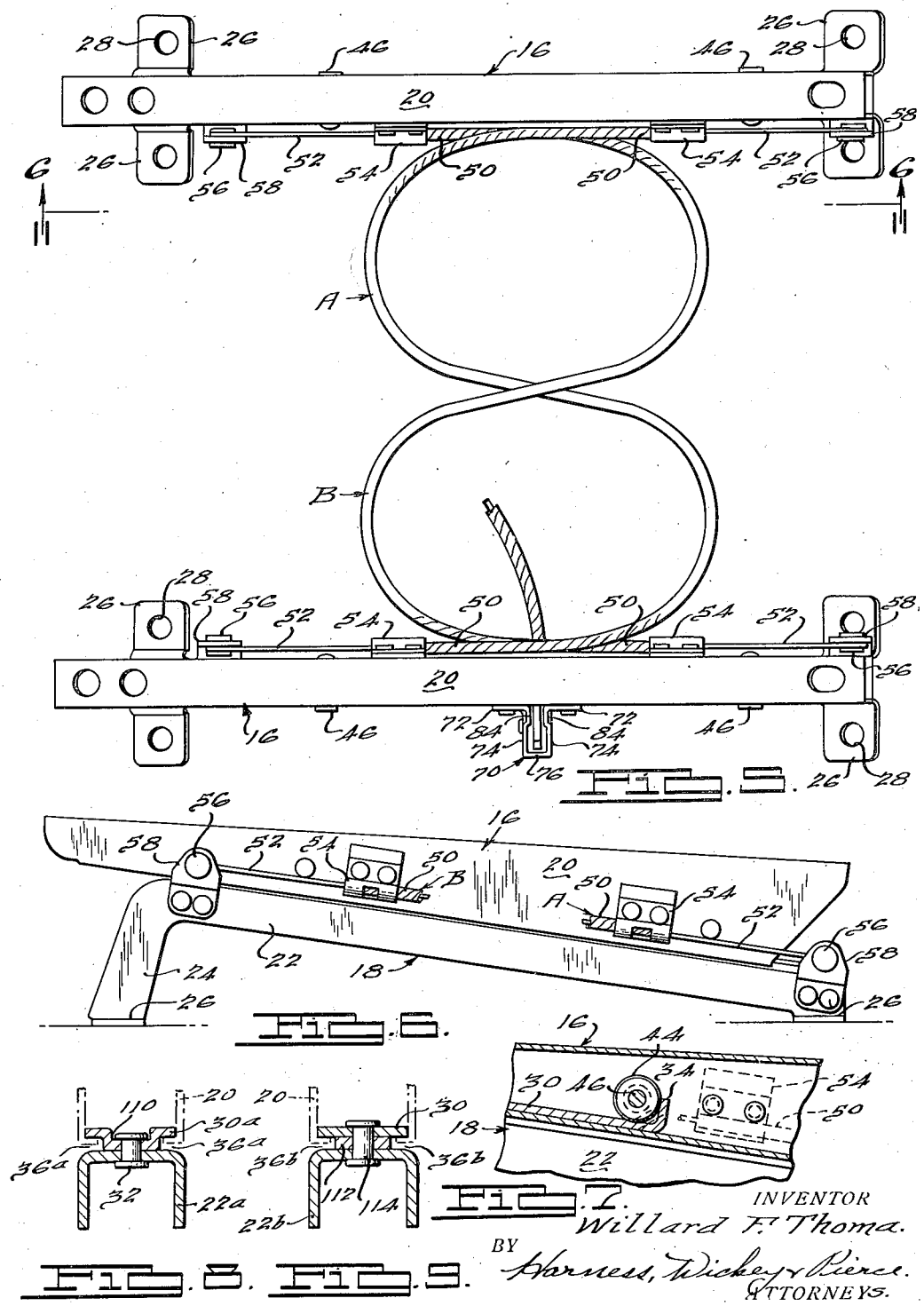

Patented Oct. 17, 1944

2,360,805

UNITED STATES PATENT OFFICE 2,360,805

SEAT SLIDE STRUCTURE

Willard F. Thoma, Detroit, Mich., assignor to National Stamping Company, Detroit, Mich., a corporation of Michigan Application November 29, 1941, Serial No. 421,003

6 Claims. (Cl. 155—14)

This invention relates to seat slides of the type commonly employed in connection with the front seats of automobiles, and has for its principal object the provision of a structure of the type described that is simple in construction, efficient in operation and economical to produce.

Objects of the invention include the provision of a simple and economical means for causing both slides of a seat slide structure to move in unison during adjustment in the position of the associated seat; the provision of a construction as above described which eliminates the requirement of interconnecting shafts and gearing to effect the desired result; the provision of a construction as above described in which the interconnection between the two seat slide structures causing the slides thereof to move in unison comprises one or more Bowden wire elements; the provision of a seat slide structure including a pair of spaced rails and a slide slidably mounted upon each of the rails, a Bowden wire being extended between the structures with the opposite ends of the casing thereof being fixed to the rails or slides while the opposite ends of the wire element itself are respectively fixed to the slides or rails; and the provision of a construction as above described in which two Bowden wires are extended between a pair of assemblies each consisting of a rail and a slide thereon, the wire of one Bowden wire element being connected to the rear end of one of the rails and to the front end of the other of the rails and the associated casings being fixed adjacent the corresponding ends of the corresponding slides, the remaining Bowden wire element having the ends of the wire itself connected to the remaining ends of the rails and the casing therefor secured to adjacent portions of the respective slides.

Further objects of the invention include the provision of a seat slide structure involving a novel arrangement of rail and slide; the provision of a seat slide structure including a rail comprising an angularly sectioned sheet metal member having a plate or track member or members secured to such top surface with its or their marginal edge portions in spaced relation with respect to the side margins of the top surface of the angularly sectioned member; the provision of a seat slide structure including a rail of the type above described and a slide of inverted channel section having inturned lower marginal edges received between the spaced marginal edges of the angularly sectioned member and its associated track member or members; the provision of a seat slide structure as above described in which the slide is provided with rollers bearing upon the upper surface of the track member or members; the provision of a construction as above described in which the track member is formed in two parts and an end portion of each of the parts is bent upwardly to form a stop for cooperating with the rollers of the slide to limit relative sliding movement of the slide upon the rail; and the provision of a novel form of latch mechanism for releasably latching the slide to the rail.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a fragmentary, partially broken, side elevational view of an automobile showing the front seat thereof adjustably supported by a seat slide mechanism constructed in accordance with the present invention;

Fig. 2 is an enlarged, side elevational view of the seat slide mechanism shown in Fig. 1 and taken looking in the same direction as Fig. 1;

Fig. 3 is an enlarged transverse, sectional view taken on the line 3—3 of Fig. 2;

Fig. 4 is an enlarged transverse, sectional view taken on the line 4—4 of Fig. 2 and illustrating in section a fragment of the floor pan of the automobile shown in Fig. 1 associated therewith;

Fig. 5 is a slightly reduced plan view of the structure shown in Fig. 2;

Fig. 6 is a side elevational view of one of the seat slide structures taken on the line 6—6 of Fig. 5;

Fig. 7 is a fragmentary vertical sectional view taken centrally and longitudinally through one of the seat slide structures shown in the preceding views to illustrate the cooperation between one of the rollers and the stop provided therefor on the associated track member;

Fig. 8 is a transverse sectional view of a modified form of rail structure; and, Fig. 9 is a transverse sectional view of a still different form of rail structure.

Seat slide structures of the type commonly employed in connection with the front seats of automobiles comprise a pair of assemblies or structures one positioned at each side of the seat and interposed between the seat and the floor. Each assembly comprises a rail fixed to the floor and a slide fixed to the seat, the slides, of course, being slidable longitudinally of the respective rails so as to permit adjustment of the position of the seat with respect to the steering wheel of the automobile. It has been found necessary in the majority of these seat slide structures to connect the two slides together in some manner to insure movement thereof in unison upon their respective rails if the desired ease in the adjustable movements of the seat is to be obtained. The conventional manner of accomplishing this movement of the slides in unison with one another is to extend a rotatable shaft between the two rails, and provide a gear on each end of the shaft fixed thereto and meshing with a rack on the corresponding slide. Thus with such a construction sliding movement of one slide upon its rail acts through its rack and cooperating gear to rotate the shaft, and the shaft through the remaining gear and rack on the remaining slide to cause equal movement of the remaining slide. The shaft, gears and rack in such case necessarily involve an expense which constitutes a material proportion of the cost of the entire structure. One of the principal features of the present invention is the provision of a simpler and cheaper construction for performing the same fuction as the shaft, gears and rack of conventional structures and, at the same time, one which is more flexible in its adaptation to a seat structure, which is equally efficient in operation and is considerably simpler in construction and operation.

In accordance with this phase of the present invention the two slides of the seat slide structure are caused to move in unison with each other during adjustment of the seats by means of a Bowden wire construction interconnecting the slides and rails. As is commonly known, Bowden wire structures comprise a relatively stiff but flexible solid wire encased in a closely coiled wire casing which is itself flexible and capable of being readily bent to any desired curvature, and this is the structure which the term "Bowden wire" refers to in this specification and in the following claims. Because of the fact that the turns of the coiled casings lie in contact with one another, forces applied to opposite ends of the casings tending to compress it longitudinally thereof are effectively resisted, and because of the fact that the casing relatively closely surrounds the internal wire, buckling of the wire is prevented when forces are applied through it tending to compress it in the direction of its length.

In accordance with the present invention the corresponding ends of the Bowden casing and wire are secured to one slide assembly and the opposite ends thereof secured to the other assembly. In securing the opposite ends of a Bowden wire structure to two seat slide structure, one is pointed forwardly and the other rearwardly. In the broader aspects of the invention it makes no difference whether the casings are secured to the slides or to the rails as long as the wire itself is secured to the other members of the two structures but preferably, and as shown in the drawings, the ends of the casing are fixed to the slide and the ends of the wire to the rails. It will be appreciated that in such case when one slide is moved on its rail it will carry the corresponding end of the Bowden wire casing with it, causing it to slide over the encompassed wire. In moving, such slide will act through the casing tending to pull or push the remaining slide, which is fastened to the other end of the casing, in a corresponding direction on its corresponding rail. Where just one Bowden wire is thus provided, movement of one slide tending to move the other slide through a pull of the casing will, of course, put the casing under longitudinal tension and a lag in the movement of one side with respect to the other may result through stretch of the casing. For this reason it is preferable to use two Bowden wires so that the movement between the slides is always transmitted through compression of one of the casings, thereby insuring positive equal movement of both slides in both directions.

It will, of course, be appreciated that as far as the use of such Bowden wires is concerned to constrain both slides to equal and simultaneous movement, it makes no difference what the particular construction of the slides and rails is and that it is adaptable to any construction having relatively movable slides and rails. However, in accordance with a further feature of the present invention a slide and rail construction of novel character is provided. This comprises a rail of angular section upon which a plate or track member is supported in such a manner that its margins are vertically spaced from the margins of the angularly sectioned member to provide a groove on each side of the rail extending longitudinally thereof adjacent the upper surface thereof. The track member may be made up of one or more sections. When made up of one section its opposite ends may be bent upwardly to form stops for cooperation with the rollers carried by the slide and when two sections are employed one end of each may be bent upwardly for the same purpose. The slide itself in such case is of inverted channel section formation with the free marginal edge portions thereof bent inwardly and received within the groove formed between the track member or members and the angularly sectioned rail members, this serving to prevent inadvertent upward disassociation of the slide with respect to the rail. The slide itself has pins extending between opposite sides thereof upon which rollers are rotatably supported and which bear against the track member or members previously referred to.

Referring now to the accompanying drawings and particularly to Fig. 1 there is indicated generally at 10 an automobile body having a floor 12 upon which a front or driver's seat 14 is supported by a pair of laterally spaced seat slide assemblies or units indicated generally at 16. As indicated in Fig. 5 there are two of these assemblies 16 and as indicated in the remaining figures each assembly 16 includes a rail indicated generally at 18 and a slide 20. The rail 18 comprises a main body portion 22 which is preferably straight in side elevation as shown and a front supporting leg 24 for supporting the main body portion 22 at an angle with respect to the floor so that the seat 14 will be elevated when adjusted to a forward position and depressed when adjusted to a rearward position, as is conventional practice. The leg 24 may be made separately from the main body portion 22 and simply secured thereto, or may be made integrally therewith as shown and which ordinarily will be preferable. The main body portion 22 and leg 24 are formed from sheet metal to an angular section. The term "angular section" is intended herein to mean any section wherein two or more walls are disposed at angles to each other. While such section may be of a simple angle formation, that is with simply a top wall and one side wall, it is preferably of channel section as shown as such section permits maximum amount of strength for the weight of material employed. Ears 26 formed integrally with the leg 24 at the forward end of the rail assembly and formed integrally with the main body portion 22 at the rear end of the rail assembly are struck outwardly therefrom for engagement with the floor 12 and are provided with openings 28 therein through which suitable securing bolts or screws may be passed for fixing the rail assembly to the floor 12.

As best brought out in Figs. 3 and 4 the upper wall of the main body portion 22 of the rail is formed to provide a central downwardly opening channel therein the sides of which are inwardly spaced from the sides of the main body portion 22 so as to form a stepped upper marginal edge along each side of the main body portion 22. One or more track members 30, each in the form of a plate or strip extending longitudinally of the rail overlie the upper surface of the main body portion 22 and are centrally secured thereto by means of rivets 32. Where one such track member 30 is employed its opposite ends may be bent up to form stops for the rollers to be hereinafter described but preferably, and as shown, two such track members 30 are employed spaced from each other at their inner ends which are bent up as at 34 and as best shown in Fig. 7 to provide the stops mentioned. The track members 30 are preferably of less width than the width of the main body portion as brought out in Figs. 3 and 4 but are of such widths that they project over each stepped edge of the main body portion 22 so as to form a longitudinally extending groove 36 between each of their outer side margins and each of the stepped edges of the main body portion of the rail 22.

The slide 16 is of inverted channel section as best brought out in Figs. 3 and 4 and is preferably formed from sheet metal. It is of a width preferably equal to the width of the main body portion 22 of the rail 18 and the lower margins of its side walls extend downwardly over the outer edges of the track members 30 and the free edge portions thereof are bent inwardly as at 38 and are received within the corresponding grooves 36 formed between the track members 30 and the upper stepped edges of the main body portion 22 of the rail. As indicated in Figs. 3 and 4 the track members 30 are preferably of such width that they are relatively closely but slidably received between the side walls of the associated slide 16 so as to prevent relative lateral movement between the slide and the rail not only serving to guide the slide on the rail but preventing rattling because of lateral movement between them in service. The upper surface of each slide 20 is flat and is adapted to receive the frame 40 for the seat 14 directly thereon and to be directly secured thereto by any suitable means. As best brought out in Fig. 2 the height of the slide 20 may vary from one end thereof to the opposite end thereof so as to accommodate it to the desired pitch of the seat 14.

A pair of rollers 44 are received in each slide 16 in spaced relation to each other longitudinally of the slide. Each roller 44 is rotatably mounted upon a pin 46 which extends through the side walls of the slide 16 and its opposite ends are headed over on the outside of such walls thereby to prevent spreading of the walls in service. The rollers 44 are centrally cut away as at 48 to provide clearance for the ends of the rivets 32 above the plane of the upper surfaces of the track members 30 and the pins 46 are so positioned that when the rollers 44 are in contact with the upper surface of the track members 30 the inturned edges 38 of the slide 16 bear against the lower marginal edges of the track members 30 so as not only to prevent upward movement of the slide 16 on its rail but also to prevent rattling which would otherwise develop between these parts in service due to such movement. As indicated best in Figs. 2 and 7 the rollers 44 are adapted to contact the stops 34 on the track members 30 in order to limit the extent of movement of the slide 20 in opposite directions on the rail 18, the relative locations of the stops 34 and rollers 44 being such as to permit the desired longitudinal sliding movement of the slide 20 on the rail 18.

Thus with the construction thus far described it will be appreciated that each seat slide assembly includes a pair of rails each having a slide slidably supported thereon for movement longitudinally thereof and so constructed and arranged as to prevent relative movement between them which might produce a rattle, and also that the weight of the seat and the occupant thereof is transmitted through the slides to the rails through rolling anti-friction members facilitating the sliding of the slides on the rails.

As previously mentioned one of the principal features of the present invention is the employment of Bowden wires for causing the slides of a pair of seat slide assemblies to move in unison with each other. In this connection and as before stated it will be appreciated that the particular construction of the rails and slides themselves is of no moment as this part of the structure may be applied to any construction where a slide is supported for movement longitudinally of its cooperating rail. The construction above described, however, may be employed in this connection as illustrative of the general type of construction to which this feature of the present invention is applicable. It will also be understood that although in principal but one Bowden wire may be used to effect the desired result, it has been found preferable to use a pair of such wires and, accordingly, such arrangement is shown in the drawings. It will also be understood, particularly after the following explanation of the construction shown, that the casings of the Bowden wire may be secured to either the rails or the slides and the enclosed wire itself in such case respectively connected to the slides or rails, I prefer to secure the casing to the slides and the enclosed wire to the rails and such arrangement is shown in the drawings by way of preference.

With the above understanding in mind and now referring to Figs. 5 and 6 the two Bowden wire assemblies are there indicated generally at A and B. Each Bowden wire assembly consists of an outer casing 50 and enclosed relatively stiff but flexible wire element 52 the opposite ends of which project outwardly beyond the corresponding ends of the respective casings 50 in accordance with conventional practice. As viewed in Fig. 5 one end of the casing 50 of the Bowden wire B is fixed to the upper slide 20 by means of a bracket 54 riveted to the side wall of the upper slide 20 and in such position that the end of the casing 50 is directed forwardly and longitudinally of the upper slide 20. The corresponding end of the wire 52 of the Bowden wire B is fixed by means of a rivet 56 to a bracket 58 fixed to the forward end of the corresponding rail 18, the rivet 56 being approximately aligned with that end of the casing 50 received in the bracket 54 described. The opposite end of the casing 50 for the Bowden wire B is fixed to the lower slide 20, as viewed in Fig. 5, by means of a bracket 54 identical to the bracket 54 previously described but in this case this end of the casing 50 is directed rearwardly and longitudinally of the lower slide 20. The corresponding end of the wire 52 is fixed to the rear end of the lower rail 18 by means of a rivet 56 and bracket 58 identical to those previously described.

Thus with the construction above described the wire 52 is anchored at opposite ends to the rails 18 which are fixed to the floor 12 of the vehicle. The opposite ends of the casing 50 are fixed to the slides 20 with one end of the Bowden wire directed forwardly and the other rearwardly. Consequently if one slide 20 is moved forwardly, for instance, it will move its corresponding end of the casing 50 forwardly with it, thus causing the entire casing to move in a corresponding direction on the wire 52, and the opposite end of the casing 50 being secured to the other slide will cause the other slide to move forwardly a corresponding amount. Rearward movement of one slide will act in a similar manner through the casing 50 to cause a similar and equal rearward movement of the other slide.

As previously mentioned the casings 50 are conventionally formed of a coil of wire relatively closely embracing the corresponding wire 52 and wound with its turns in contact with each other. For this reason while the casings 50 are not contractible in the direction of their length because the coils thereof lie one against the other, they are extensible to a greater or lesser extent under forces tending to stretch them in the direction of their length. Thus while movement of one of the slides 20 in Fig. 5 such as to cause movement of the remaining slides through compression transmitted through the casing 50 of one of the Bowden wires only would cause positive, equal and simultaneous movement of the other slide, where such movement placed the casing 50 under tension sufficient to cause it to extend its length to any extent it would cause a lag in the corresponding movement of the remaining slide. It is for this reason that two Bowden wires are employed and in such case they are arranged so that regardless of the direction of movement of either slide 20 such movement will be transmitted through compression of one of the casings 50 to the other slide to insure positive equal movement of the two slides. Accordingly, the Bowden wire A is arranged with one end of its casing 50 fixed by a bracket 54 to the upper slide 20, as viewed in Fig. 5, but in this case directed rearwardly longitudinally of such slide 20, and the corresponding end of its wire 52 is fixed to the rear end of the corresponding rail 18 by means of a rivet 56 and bracket 58 identical to those previously described. Similarly the opposite end of the casing of the Bowden wire A is fixed by a bracket 54 to the lower slide 20 in a forwardly extending direction and the corresponding end of its wire 52 is fixed by a rivet 56 and bracket 58 to the associated lower rail 18 adjacent the forward end thereof. Thus with this construction regardless of which slide 20 initiates movement in either direction it will act through compression of one of the casings 50 for either of the Bowden wires A or B to positively transmit such movement simultaneously and equally to the other slide 20.

From the above it will be appreciated that the use of the Bowden wires described provides a construction that is equally positive in operation to the conventional shaft connected gears and racks now conventionally employed but may be employed at a materially lower cost. Additionally because of the flexibility of the Bowden wires A and B one assembly comprising a pair of seat slides interconnected thereby may be employed without any change whatever on seats where the seat slide assemblies are located at different distances between them. This eliminates the requirement necessary in conventional constructions of producing shafts of various lengths to accommodate various spacings of the seat slide assemblies. Furthermore, the construction permits the packaging of the connected assemblies in a small package and facilitates shipping and handling of the same.

A novel latch mechanism for releasably latching the slides 20 in slidably adjusted position is also provided in accordance with the present invention. This is best shown in Figs. 2, 4 and 5. As indicated in these figures a bracket, indicated generally at 70, is fixed to the lefthand face of the lefthand rail 18, as viewed from the driver's seat, intermediate the length of the main body portion 22 of the rail. The bracket 70 is formed from a single piece of sheet metal to provide a pair of oppositely directed attaching flanges 72, and a pair of outwardly directed spaced side wall portions 74 which are integrally connected together at their outer ends by the cross-wall 76. The upper end of a flat latch member 78 is received between the side walls 74 and is pivotally mounted between its ends therein by means of a pin 80 extending through and fixed to such side walls. A spring 82 of conventional construction having a loop surrounding the pin 80 between each side of the latch member 78 and the corresponding side walls 74 of the bracket 76, cooperates between the latch member 78 and the bracket 70 to constantly urge the latch member 78 in a counterclockwise direction of rotation as viewed in Fig. 4. Each side wall 74 adjacent the inner edge of the bracket 74 and adjacent the upper margin thereof is offset inwardly as at 84 so as to closely but slidably receive and guide the adjacent portion of the latch member 78 therebetween.

As best viewed in Figs. 2 and 4 the lower outer edge of the slide 16 associated with that rail 18 upon which the bracket 70 is mounted is slotted as at 86 at spaced intervals over its central portion, the plane of the slots being perpendicular to the plane of the corresponding side face of the slide 20. The slots 86 are of such size and are so disposed that when the slide 20 is moved to bring any one of them into transverse alignment with the upper end of the latch 78, the upper end of the latch 78 may be projected thereinto under the force of the spring 82. The latch member 78 being immovable longitudinally of the rail 18 it will thus serve, when projected into one of the slots 86, to lock the slide 20 against sliding movement upon the associated rail 18. The surfaces 84 form abutments for the latch member 78 in closely adjacent relationship with respect to that portion thereof received in the slots 86 and thus serve to relieve the latch member 78 from a major portion of the bending forces which it would otherwise be subjected to were its support on the pivot pin 80 solely relied upon to maintain the position of its operative edge.

Only one bracket 74 and latch member 78 is required in the structure shown for inasmuch as if one slide 20 is latched against relative movement on its associated rail the remaining slide 20 is likewise held against movement on its rail through the operation of the Bowden wires A and B. Thus the one latch mechanism serves to latch both slides against relative movement on the respective rails.

Broadly speaking, any suitable or conventional means may be provided for operating the latch member 78 against the force of the spring 82 in order to release it from any one of the notches 86 it may be engaged with so as to permit adjusting movement of the seat. The particular means shown comprises a Bowden wire assembly indicated generally at C and comprising a casing 90 and an enclosed wire 92. One end of the casing 90 is fixed to the floor 12 in spaced but transverse alignment with the lower end of the latch member 78 by means of a clip or bracket 94. The corresponding end of the wire 92 is secured to the lower end of the latch member 78. The Bowden wire C extends from the lower end of the latch member 78 along the floor and up the dash to a bracket 96 fixed to the usual instrument panel 98 of the automobile. The remaining end of the casing 90 is fixed to the bracket 96 and the corresponding end of the wire 92 is secured to a button 100 exposed on the face of the instrument panel 98 and having a stem, not shown, slidably received in the bracket 96. Thus when the button 100 is pulled by the operator of the automobile the wire 92 is drawn through the casing 90 and the latch 78 is caused to rotate in a clockwise direction of rotation, as viewed in Fig. 4, against the force of the spring 82. As previously explained this permits adjustment of the seat 14 in a forward and rearward direction and when it has been adjusted to the desired position the button 100 may be pressed inwardly, thus permitting the spring 82 to cause the latch 78 to be re-engaged in any particular notch 86 with which it is then aligned. The Bowden wire C may be extended under the usual padded floor covering so as to be completely concealed from view and protected against damage.

In Figs. 8 and 9 modified forms of construction for the rails 18 are shown. In Fig. 8 the main body portion 22a of the rail, corresponding to the main body portion 22 of the rail previously described, is of simple channel section, that is, its transverse wall is flat for the full width thereof and the stepped edges of the main body portion 22 of the rail previously described are eliminated. The track member or members 30a in this case are not completely flat as in the case of the track members 30 but instead in this case are centrally depressed to form an upwardly opening channel 110 extending longitudinally thereof between the side margins thereof. The same rivets 32 may be employed for securing the track member 30a to the main body portion 22a but in this case the heads of the rivets are received within the channel 110 and consequently full cylindrical rollers may be employed in place of the rollers 44 previously described. As will be appreciated by an inspection of Fig. 8, the provision of the central channel 110 in the track members 30a spaces the outer side margins of the track members 30a upwardly from the upper wall of the rail member 22a so as to provide a groove 36a, corresponding to the groove 36 previously described, along each upper edge of the rail for reception of the lower inturned edges of the slide which, of course, may be identical to the slide 20 previously described.

In the construction illustrated in Fig. 9 the main body portion 22b of the rail may be identical to the main body portion 22a of the rail in Fig. 8. In this case the same track members 30 are employed as in the construction first described and in order to provide grooves 36b along each side of the rail for reception of the inturned edges of the slide 20, spacers 112 are interposed between the upper surface of the main body portion 22b of the rail and the lower surface of the track member or members 30 in surrounding relation with respect to the rivets 114 which are provided for securing these parts together. With the construction illustrated in Fig. 9 the same type of rollers 44 as are employed in the first described construction, that is with the centrally relieved portion 48, are necessarily employed in order to provide clearance for the head of the rivets 114.

Having thus described my invention what I claim by Letters Patent is:

1. In a seat slide construction, in combination, a longitudinally extending rail having an upper wall, a pair of track members secured to the upper wall of said rail in parallelism therewith and cooperating therewith to provide a longitudinally extending groove between their outer side margins and the outer side margins of said rail, the adjacent ends of said track members being spaced from one another and upwardly bent to provide stops, a slide including spaced side wall portions embracing opposite sides of said track members, inturned flanges on said side walls slidably received in said grooves, and rolling anti-friction members interposed between said slide and track members and engageable with said upwardly bent ends of said track members to limit the sliding movement of said slide on said rail.

2. In a seat slide construction, in combination, a pair of laterally spaced seat slide structures, each of said structures comprising a rail member and a slide mounted thereon for relative movement longitudinally thereof, and a Bowden wire including a casing and an enclosed wire element extending between said structures with the casing thereof fixed at its opposite ends to corresponding members of both structures and said wire element projecting beyond the opposite ends of said casing a substantial amount and being fixed at its opposite ends to the remaining members of said structures, one end of said Bowden wire being directed forwardly and the opposite end thereof being directed rearwardly.

3. In a seat slide construction of the type including a pair of laterally spaced seat slide structures each including a rail member and a slide member mounted thereon for movement longitudinally thereof, the combination with said seat slide structures of means interconnecting them for constraining said slide members for simultaneous movement in the same direction comprising a Bowden wire assembly interconnecting said structures, said Bowden wire assembly including a casing and an enclosed wire, means securing one end of said casing to one of the members of one of said structures with its end directed forwardly and to the corresponding member of the other of said structures with its corresponding end directed rearwardly, and means securing one end of said wire to the remaining member of the first mentioned of said structures and the opposite end of said wire to the remaining member of the second mentioned of said structures, said wire being of a length greater than the length of said casing by a distance substantially equal to the range of movement of said slides on said rails, whereby movement of said slides on said rails is accomplished by a corresponding relative movement of said wire in said casing.

4. In a seat slide construction of the type including a pair of laterally spaced seat slide structures each including a rail member and a slide member mounted thereon for movement longitudinally thereof, the combination with said seat slide structures of means interconnecting them for constraining said slide members for simultaneous movement in the same direction comprising a pair of Bowden wire assemblies interconnecting said structures, each of said Bowden wire assemblies including a casing and an enclosed wire, one end of the casing of one of said Bowden wire assemblies being fixed to one of the members of one of said structures in a forwardly directed relation with respect thereto and an end of the casing of the other of said Bowden wire assemblies being fixed to the corresponding member of the other of said structures in a forwardly directed relation with respect thereto, the opposite ends of the casings of said Bowden wire assemblies being fixed to the corresponding members on the opposite of said structures in a rearwardly directed relation with respect thereto, the ends of said wires projecting beyond the ends of their respective casings and being secured to the other of said members of the corresponding of said structures.

5. In a seat slide construction including a pair of laterally spaced seat slide structures each including a rail and a slide slidably mounted thereon, the combination with said rails and slides of means for constraining said slides for simultaneous equal movement in the same direction on their rails comprising a pair of Bowden wire assemblies interconnecting said seat slide structure, said Bowden wire assemblies each comprising a casing and an enclosed wire slidably received therein and of a materially greater length than said casing so that its opposite ends project beyond both ends of said casing, the casing of one of said Bowden wire assemblies being fixed to one of said slides and in a forwardly directed relation with respect thereto and its opposite end being fixed to the other of said slides in a rearwardly directed relation with respect thereto, one end of the casing of the remaining Bowden wire assembly being fixed to said other of said slides in a forwardly directed relation with respect thereto and its opposite end being fixed to said one of said slides in a rearwardly directed relation with respect thereto, and the corresponding ends of said wires of said Bowden wire assemblies being fixed to the corresponding of said rails in normally axially outwardly spaced relation with respect to the corresponding end of the corresponding casing.

6. In a seat slide structure, in combination, a rail member having integrally connected top and side walls, track means secured to said top wall in overlying relationship with respect thereto and cooperating therewith to provide a groove extending longitudinally thereof on each side of said rail, one marginal edge portion of said track means having a notch therein; a slide having laterally spaced side wall portions embracing opposite sides of said track means, inturned flanges on said side walls of said slide received in said grooves, the flanged edge of that one of said slide side walls on the side of said track having said notch therein being provided with a plurality of longitudinally spaced slots, a bracket fixed to said side wall of said track, and a latch pivotally mounted on said bracket and operable through any one of said slots in said slide side wall aligned therewith through sliding of said slide on said track means into releasable engagement with said notch in said track means.

WILLARD F. THOMA.